(12) United States Patent
Janssen

(10) Patent No.: US 7,471,011 B2
(45) Date of Patent: Dec. 30, 2008

(54) WIND TURBINE OVER-VOLTAGE EXPOSURE

(75) Inventor: Wilhelm Janssen, Saterland (DE)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 11/461,225

(22) Filed: Jul. 31, 2006

(65) Prior Publication Data

US 2007/0035136 A1 Feb. 15, 2007

(30) Foreign Application Priority Data

Aug. 12, 2005 (EP) .................. 05017630

(51) Int. Cl.
*F03D 9/00* (2006.01)
*H02P 9/04* (2006.01)

(52) U.S. Cl. ............... 290/55; 290/44; 322/7; 322/44

(58) Field of Classification Search ......... 290/44, 290/43, 54, 55; 416/132 B, 7; 60/398; 415/2.1, 415/4.2, 4.5
See application file for complete search history.

(56) References Cited

U.S. PATENT DOCUMENTS

| | | | | |
|---|---|---|---|---|
| 4,511,807 | A * | 4/1985 | Somerville | 290/44 |
| 4,816,696 | A * | 3/1989 | Sakayori et al. | 290/52 |
| 5,225,712 | A * | 7/1993 | Erdman | 290/44 |
| 6,566,764 | B2 * | 5/2003 | Rebsdorf et al. | 290/44 |
| 6,784,564 | B1 * | 8/2004 | Wobben | 290/44 |
| 6,856,041 | B2 * | 2/2005 | Siebenthaler et al. | 290/44 |
| 6,921,985 | B2 * | 7/2005 | Janssen et al. | 290/44 |
| 7,095,128 | B2 * | 8/2006 | Canini et al. | 290/44 |
| 7,102,248 | B2 * | 9/2006 | Wobben | 290/44 |
| 7,253,537 | B2 * | 8/2007 | Weng et al. | 290/44 |
| 7,256,508 | B2 * | 8/2007 | Altemark et al. | 290/44 |
| 2004/0026929 | A1 | 2/2004 | Rebsdorf et al. | |
| 2004/0100102 | A1 * | 5/2004 | Wobben | 290/55 |
| 2004/0145188 | A1 * | 7/2004 | Janssen et al. | 290/44 |
| 2005/0200337 | A1 * | 9/2005 | Schreiber et al. | 323/205 |
| 2005/0236838 | A1 * | 10/2005 | Rosebrock et al. | 290/44 |
| 2006/0163881 | A1 * | 7/2006 | Bucker et al. | 290/44 |
| 2006/0192390 | A1 * | 8/2006 | Juanarena Saragueta et al. | 290/44 |
| 2007/0052244 | A1 * | 3/2007 | Hudson | 290/44 |

FOREIGN PATENT DOCUMENTS

| | | |
|---|---|---|
| DE | 4428086 | 2/1996 |
| DE | 19651364 | 6/1998 |
| DE | 10105892 | 9/2002 |
| WO | WO2004/098261 | 11/2004 |

* cited by examiner

*Primary Examiner*—Julio Gonzalez
(74) *Attorney, Agent, or Firm*—GE Global Patent Operation

(57) ABSTRACT

The present invention relates to s wind turbine having a power generator for generating power for a first power line of a power grid; said wind turbine comprising a first transformer having a first primary coil connected to said power generator and a first secondary coil connected to said first power line for transforming a first primary voltage (vp1) across said first primary coil to a first secondary voltage (vs1) across said first secondary coil; further, the wind turbine according to the invention comprises a first electric circuit connected to said first primary coil; said first electric circuit having a first switching element for providing a first current path parallel to said first primary coil if said first secondary voltage (vs1) exceeds a predetermined first voltage limit value.

15 Claims, 5 Drawing Sheets

WIND TURBINE OVER-VOLTAGE EXPOSURE

FIELD OF THE INVENTION

The present invention relates to a wind turbine for generating power for a power grid and, in particular, to a wind turbine exposed to over-voltage on the power grid side.

BACKGROUND OF THE INVENTION

Wind turbines are occasionally exposed to over-voltage from the power grid side due to power grid instabilities. Usually, if the over-voltages exceed predetermined values, the wind turbines become disconnected from the grid to avoid any damage to the wind turbine system. Disconnecting a wind turbine from a power grid, however, may generate significant down times since it takes some time to reconnect the wind turbine to the grid again. Even more, disconnecting wind turbines from the power grid in case of over-voltages due to power grid instabilities may contribute additional instability to the power grid. Disconnecting a wind turbine from the power grid in case of grid instability therefore may lead to a chain reaction that severely damages grid stability.

In order to overcome the danger of grid instability and wind turbine damage, grid utility providers usually request minimum over-voltage tolerances that wind turbines have to withstand before they are allowed to disconnect from the power grid. This has led to the effect that at present, components of current wind turbines that provide a voltage of 690 V at 50 Hz are designed to withstand an over-voltage of 110% for all times, an over-voltage of 115% for a duration of 1 s, and an over-voltage of 120% for a duration of 100 ms. However, in the meantime, countries or regions like Scottland have established grid over-voltage requirements that require a wind turbine to ride through a power over-voltage of up to 150%. Such high over-voltages are likely to damage present wind turbines.

SUMMARY OF THE INVENTION

In order to overcome the above mentioned problems and, in particular, in order to overcome the problem of wind turbine damage due to over-voltages on the power grid side, a wind turbine according to claim 1 is provided. Further aspects, advantages and features of the present invention are apparent from the dependent claims, the description and the accompanying drawings.

The wind turbine according to the invention includes a wind turbine having a power generator for generating power for a power grid having a first power line; it is further included a first transformer having a first primary coil connected to said power generator and a first secondary coil connected to said first power line for transforming a first primary voltage across said first primary coil to a first secondary voltage across said first secondary coil; the wind turbine according to the invention further includes a first electric circuit connected to said first primary coil whereby said first electric circuit has a first switching element for providing a first current path parallel to said first primary coil if said first secondary voltage exceeds a predetermined first voltage limit value.

With the first switching element of said first electric circuit providing a first current path parallel to said first primary coil, the first primary voltage across the first primary coil can be reduced compared to the case where the first current path is disconnected. Preferably, the parallel path includes a stand-by rectifier with chopper and damp resistors (or damp inductor). The reduction of the first primary voltage can prevent over-voltage on the power grid side from reaching through to the power generator and other sensitive equipment within the turbine. The first switching element enables selective activation of the parallel current path only at times when it is needed, i.e. during over-voltage. This way, with the electric circuit in stand-by, the wind turbine is protected from over-voltage while hardly consuming any power during normal operation, i.e. at no over-voltage. With the first electric circuit, a stand-by damp unit is provided which can cut the voltage peaks to permissible values when extreme voltage peaks occur on the power grid (utility grid). Further, with the wind turbine protected this way from over-voltage, it is not necessary any more to disconnect the wind turbine from the power grid. This way, the power generation efficiency of the wind turbine can be significantly increased. Further, the present invention facilitates a very simple implementation of over-voltage protection since, with the transformers already in place, only a first electric circuit needs to be connected to the first primary coil. This way, already existing wind turbines can be easily retrofit with the over-voltage protection according to the invention.

Since most power grids have a first, a second and a third power line for transmitting currents at three different phases, it is preferred that the wind turbine, in addition to said first transformer, has a second (and optionally a third) transformer having a second (and respective third) primary coil connected to said power generator and a second (and optionally third) secondary coil connected to said second (and respective third) power line for transforming a second (and respective third) primary voltage across said second (and respective third) primary coil to a second (and respective third) secondary voltage across said second (and respective third) secondary coil. In this case it is preferred that for at least two of said first, second and third transformers, there is a current path parallel to said respective first, second or third primary coil if respective first, second or third secondary voltage exceeds a predetermined first voltage limit value. It is further preferred that said first, second and/or third switching elements are of the same type in order to have the same switching behaviour.

Preferably, at least one of said first, second and third electric circuit comprises a respective first, second or third damping component for limiting the current of said respective first, second or third current paths. By limiting the current on the respective current paths, it is possible to control the voltage reduction of the over-voltage in order to minimize distortions due to the first, second or third electric circuits on the one hand and to prevent wind turbine damage on the other hand.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures wherein:

FIG. 2b discloses the voltage curves of a power line and the respective primary voltage resulting from the electric circuit of FIG. 2a.

FIG. 3b discloses the voltage curves of a power line and the respective primary voltage resulting from the electric circuit of FIG. 3a.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
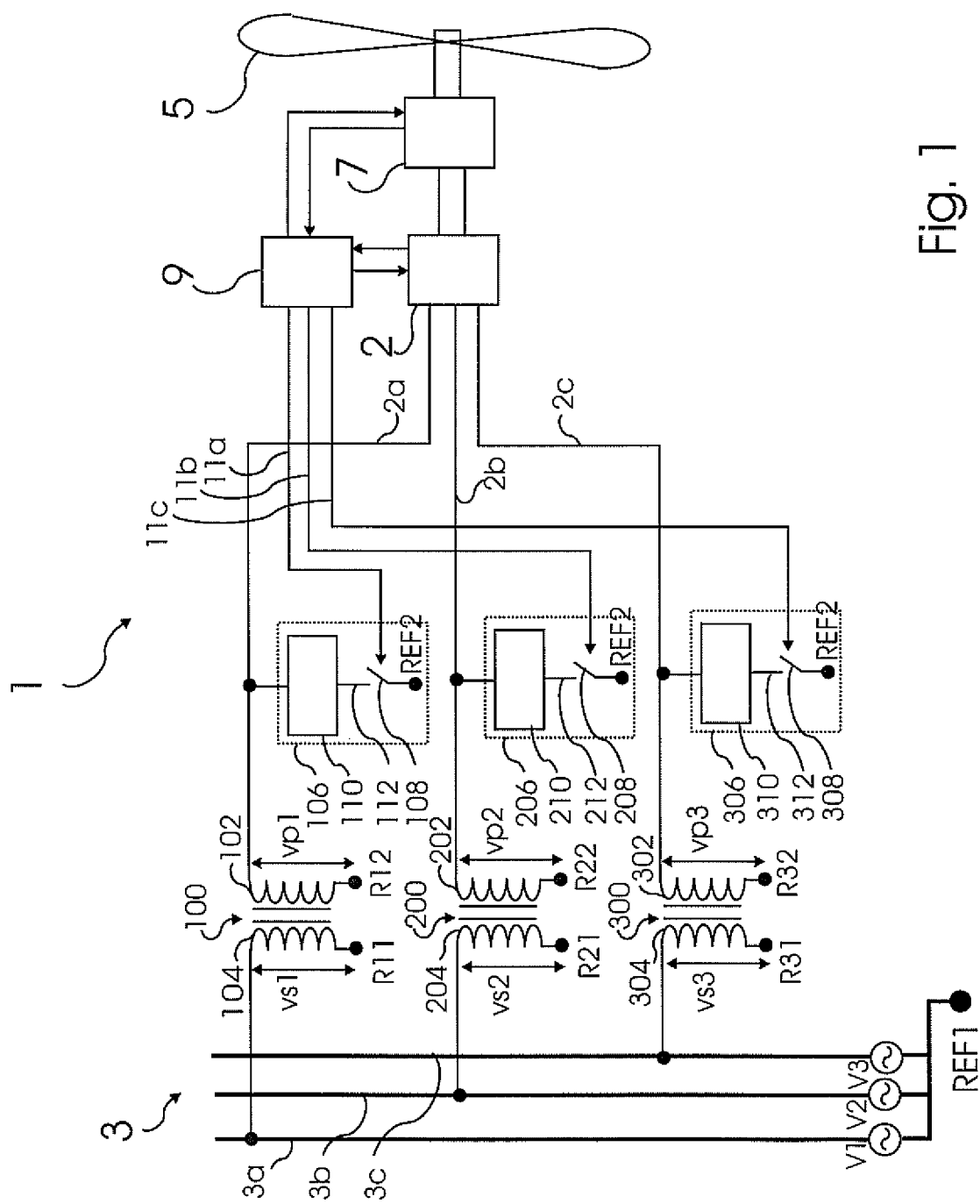
FIG. 1 is a schematic view of a wind turbine according to a first embodiment of the present invention having a current path parallel to each of the three respective primary coils.

FIG. 1 discloses schematically a wind turbine 1 for providing power to the first, second and third lines 3a, 3b, 3c of a power grid 3. In this case, the three power grid lines transmit alternating currents at a frequency of 50 Hz at a peak to peak voltage of 380 kV whereby the phase of the alternating voltages of the three lines is shifted by 120 degrees with respect to each other. However, a skilled person will immediately recognize that the present invention is independent of the specific power grid parameters and that it can be equally applied to power grids with less lines, lower or higher voltages, and/or lower or higher frequencies.

FIG. 1 discloses typical components of a typical wind turbine. It includes a rotor 5 for converting wind energy into mechanical rotational energy, a gear box 7 for converting rotational speed of rotor 5 to a rotational speed better suited for efficient power generation in power generator 2, and a central control unit 9 that coordinates the operation of the various wind turbine components by reading parameters from and issuing commands to the respective wind turbine components. It should be mentioned that FIG. 1 is only an example which is not meant to limit the present invention in any ways. In particular, it should also be mentioned that in the description and the figures, power generator 2 is to be understood in a broad sense that may include rotor and stator as well as rectifiers and inverters and other active components that may be used for adjusting voltage, frequency and phase of the generated power to the values required for power grid supply. Accordingly, first, second and third lines 2a, 2b, 2c in the figures below are preferably to be understood as the lines that are directly connected with the respective transformers 100, 200, 300 to provide a connection with any one of the active components of the power generator 2.

Further, it should be mentioned that the voltages introduced in the description refer to voltages taken in reference to either first reference voltage REF1 or second reference voltage REF2 as shown in the figures. Preferably, first reference voltage REF1 and second reference voltage REF2 are the same.

As mentioned above, first, second and third lines 2a, 2b, 2c transmit the power generated by power generator 2 to respective first, second or third lines 3a, 3b, 3c of power grid 3 via respective first, second or third transformers 100, 200, 300. First, second and third transformers 100, 200, 300 serve to transform the respective first, second or third primary voltages vp1, vp2, vp3 across respective first, second or third primary coils 102, 202, 302 to respective first, second or third secondary voltages vs1, vs2, vs3 across respective first, second or third secondary coils 104, 204, 304 that in the present case match the voltages on the first, second or third power lines 3a, 3b, 3c.

For example, power generator 2 may be designed to generate alternating first, second and third primary voltages vp1, vp2, vp3 having a peak-to-peak voltage value of 690V that each have a frequency of 50 Hz and that are phase shifted by 120 degrees with respect to each other. In order to provide the power of the power generator to respective first, second and third power lines 3a, 3b, 3c that have a peak-to-peak voltage of 380 KV, first, second and third transformers each need to amplify the respective first, second or third primary voltages vp1, vp2, vp3 by a factor of about 550. Further, for delivering a typical power of 1.5 MW, first, second and third primary coils of the transformers each carry a current of about 1260 Ampere at a voltage of 690 Volts.

Since first, second and third power lines 3a, 3b, 3c of power grid 3 in FIG. 1 are directly connected with respective first, second or third secondary coils 104, 204, 304, over-voltages on power grid 3 may couple voltage changes through respective first, second or third transformer 100, 200, 300 that may damage power generator 2 if there is no over-voltage protection. If the voltage curves on the respective first, second or third power lines are sine-shaped alternating voltage curves, over-voltage occurs each time when the absolute value of that voltage exceeds an absolute predetermined respective first, second or third voltage limit value. Preferably, the predetermined respective first, second and third voltage limit values are chosen to provide a voltage range within which the voltages of first, second or third power lines 3a, 3b, 3c may vary without damaging the wind turbine.

FIG. 1 further discloses first, second and third electric circuits 106, 206, 306 connected to respective first, second or third primary coils 102, 202, 302 in order to provide respective first, second or third current paths 112, 212, 312 parallel to respective first, second or third primary coils 102, 202, 302 in the case that respective first, second or third secondary voltages vs1, vs2, vs3 exceed predetermined respective first, second or third voltage limit values. In FIG. 1, respective first, second or third current paths 112, 212, 312 provide each a path between respective first, second or third lines 2a, 2b, 2c of power generator 2 and a second reference voltage R2.

First, second and third electric circuits 106, 206, 306 each have a respective first, second or third switching element 108, 208, 308 which each can be closed to provide for a respective current path 112, 212, 312, and which each can be opened to interrupt the respective current paths 112, 212, 312. In FIG. 1, first, second and third switching elements 108, 208, 308 each comprise a Gate-Turn-Off Thyristor (GTO), an Insulated-Gate Bipolar Transistor (IGBT), an IGCT or a thyristor that each are capable of switching high voltages, for example 690 V, and high currents, for example 200 A. Depending on the protection needed, it is preferred that each of the switching elements is capable of switching a current of more than 0.01%, preferably of more than 0.1% and even more preferred of more than 1% of the nominal maximum current for the respective first, second or third primary coil. Further, it is preferred that all components of the first, second and third electric circuit are capable of withstanding the same current. This way, it is possible to draw a significant fraction of the current of respective first, second or third lines 2a, 2b, 2c that otherwise would flow through respective first, second or third primary coil 102, 202, 302. This way, the current through respective first, second or third primary coil 102, 202, 302 can be reduced which in turn reduces respective first, second or third primary voltages vp1, vp2, vp2. This is how first, second and third current paths 112, 212, 312 can be used to protect power generator 2 from over-voltage generated on the power grid 3.

Preferably, as shown in FIG. 1, first, second and third switching elements are controlled by central control unit 9 that is connected to the control terminals (e.g. gates of the transistors) of switching elements 112, 212, 312 (e.g. IGBT or GTO) via respective first, second or third control lines 11a, 11b, 11c. By issuing appropriate signals on the control lines 11a, 11b, 11c at the right times, respective first, second or third switching element 112, 212, 312 becomes closed in case of over-voltage, and opened once the over-voltage has disappeared. This way, by closing and opening the switching elements depending on the presence of over-voltage, it is possible that first, second or third primary voltages vp1, vp2, vp2 are only distorted when over-voltage is present. This minimizes the loss of energy due to over-voltage.

FIG. 1 further discloses first, second and third damping components 110, 210, 310 connected in series with respective first, second or third current paths 112, 212, 312 for limiting the current therein. Current limitation is used to avoid that first, second or third primary voltages vp1, vp2, vp3 break down completely when the respective switching element has been closed. There are many ways in which electronic components connected in series with respective current paths can limit the current therein. For example, first, second or third damping component may each consist of a resistor R. In this case, for example, the current i1 drawn through first switching element 108 is limited according to Ohm's law to: i1=vp1/R. Generally, the resistor value should be selected in view of the maximum over-voltage values that can be expected from the power grid, and of the inductance that the transformer represents when seen from power grid 3.

Figure 2A:
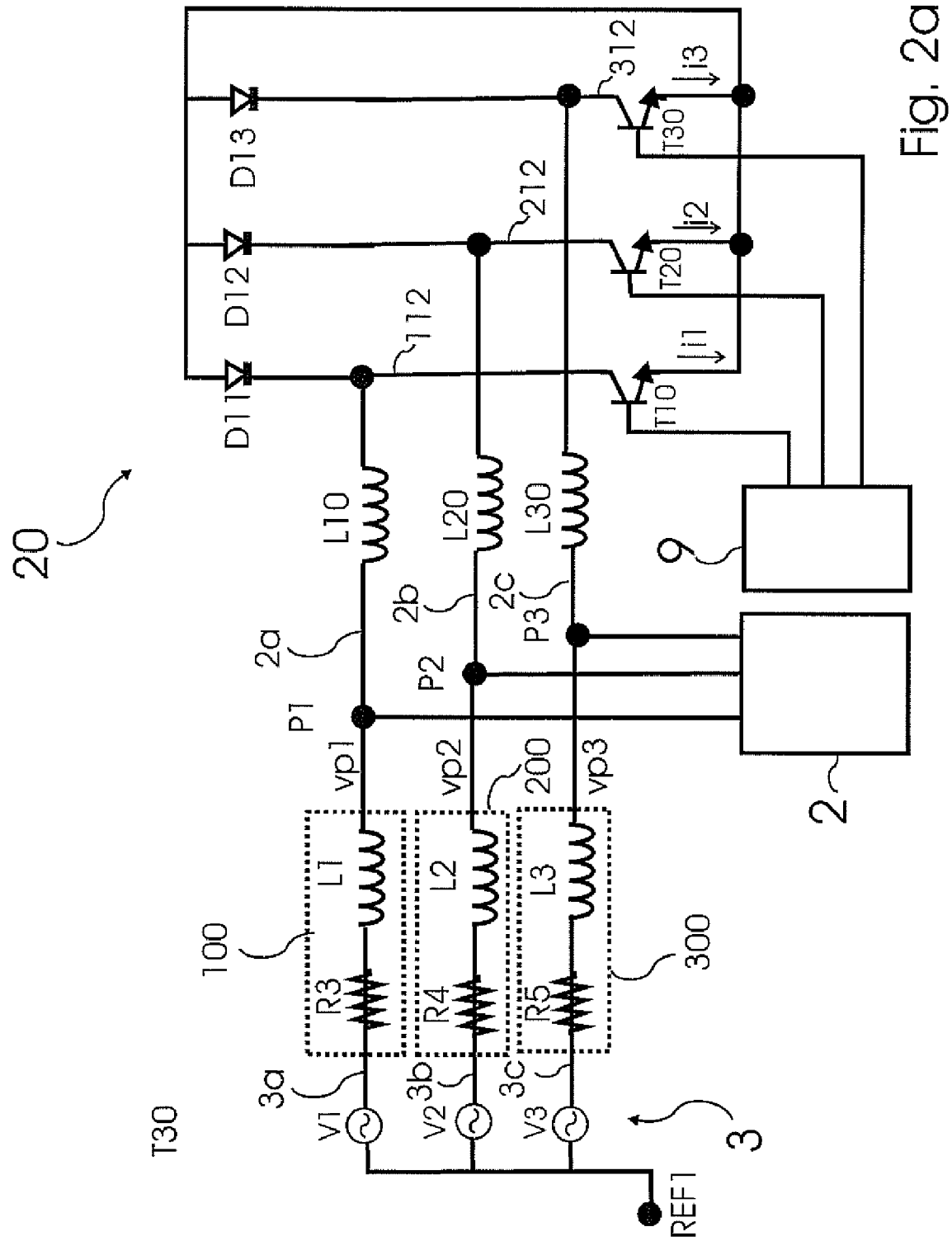
FIG. 2a is a schematic view of a wind turbine according to a second embodiment of the present invention having a current path parallel to each of the three respective primary coils and where inductors are used for limiting the currents.

FIG. 2a discloses schematically a further embodiment according to the invention with first electric circuit comprising first switching element T10 in series with first damping component L10, second electric circuit comprising second switching element T20 in series with second damping component L20, and third electric circuit comprising third switching element T30 in series with third damping component L30 to protect power generator 2 from over-voltage generated by respective first, second and third voltage sources V1, V2 and V3. First, second and third voltage sources V1, V2 and V3 are applied to respective first, second and third power lines 3a, 3b, 3c.

In order to better analyze the electronic behaviour of the transformers 100, 200, 300 in connection with the switching elements T10, T20, T30 and the damping components L10, L20 L30 exposed to the voltages of first, second and third voltage sources V1, V2, V3, first, second and third transformers 100, 200, 300 of FIG. 1 are shown in FIG. 2a as equivalence circuits where the inductances L1, L2, L3 in series with resistances R3, R4, R5 represent the respective effective inductances and resistances as seen by power generator 2. The components are preferably designed for withstanding a current that, for at least 300 to 500 ms, can be larger or equal to approximately 5 or 6 times the rated transformer current. In other words, for example, a voltage drop across transformers 100 between first secondary coil and first primary coil in FIG. 1 is represented in FIG. 2a by a voltage drop caused by resistor R3 in series with inductor L1. Therefore, a voltage measured at position P1 on first line 2a is equivalent to first primary voltage vp1 of FIG. 1, a voltage measured at position P2 on second line 2b is equivalent to second primary voltage vp2 of FIG. 1, and a voltage measured at position P3 on third line 2c is equivalent to third primary voltage vp3 of FIG. 1.

The protection of power generator 2 against over-voltage generated by first, second and third voltage sources V1, V2, V3 will be described below for first power line 3a and first line 2a. In order to protect power generator 2 against over-voltage, first switching element T10 and first damping component L10 are connected to the first primary coil (see FIG. 1, not shown in FIG. 2a) of first transformer 100 to provide for a first current path 112 parallel to the first primary coil. In FIG. 2a, first switching element T10 is a bipolar power transistor that has a collector, an emitter and a base and that is capable of switching high voltages (e.g. 690 V) and high currents (e.g. several amperes to several hundred ampers) in one direction. Further, first damping component L10 in FIG. 2a is an inductor. With an inductor, the voltage drop across first transistor 100 is in phase with the voltage generated by first voltage source V1 as long as the resistance of resistor R3 is small.

Similarly, second bipolar power transistor T20 and second damping component L20 are connected to the second primary coil (not shown in FIG. 2a) of second transformer 200 to provide for a second current path 212 parallel to the second primary coil to protect power generator 2 from over-voltage generated by second voltage source V2, and third bipolar power transistor T30 and third damping component L30 are connected to the third primary coil (not shown in FIG. 2a) of third transformer 200 to provide for a third current path 312 parallel to the third primary coil to protect power generator 2 from over-voltage generated by third voltage source V3. The protection of power generator 2 from over-voltages generated by second and third voltage sources V2, V3 works by the same principles as described above for the over-voltage generated by first voltage source V1.

FIG. 2a further discloses diodes D11, D12, D13 whose cathodes are connected to one of the respective inductors L10, L20, L30 and to one of the respective collectors of the bipolar power transistors T10, T20, T30, and whose anodes are connected to the emitters of all three bipolar power transistors T10, T20, T30. The diodes D11, D12, D13 provide that during operation, the emitters of the bipolar power transistors T10, T20, T30 are connected to a potential that is more negative than the respective collectors of the bipolar power transistors T10, T20, T30. This way, the bipolar transistors T10, T20, T30 remain in saturation mode in which they can be switched on and off depending on the potential that is applied to the respective bases of the transistors.

FIG. 2a also discloses central control unit 9 that is connected to the bases of first, second and third bipolar power transistors T10, T20, T30 to switch the power transistors T10, T20, T30 on (switching element is closed) and off (switching element is open) depending on whether one of the voltages of first, second and third voltage sources V1, V2, V3 is in the over-voltage range or not. For example, if first voltage source V1 is in the over-voltage range, i.e. the absolute value of the voltage provided by first voltage source V1 exceeds an absolute predetermined voltage limit value, central control unit 9 sends a signal to first bipolar power transistor T10. This signal closes bipolar power transistor T10 to provide for low impedance across power transistor T10 to draw a significant current i1 from first line 2a for first primary voltage vp1 reduction.

Figure 2B:
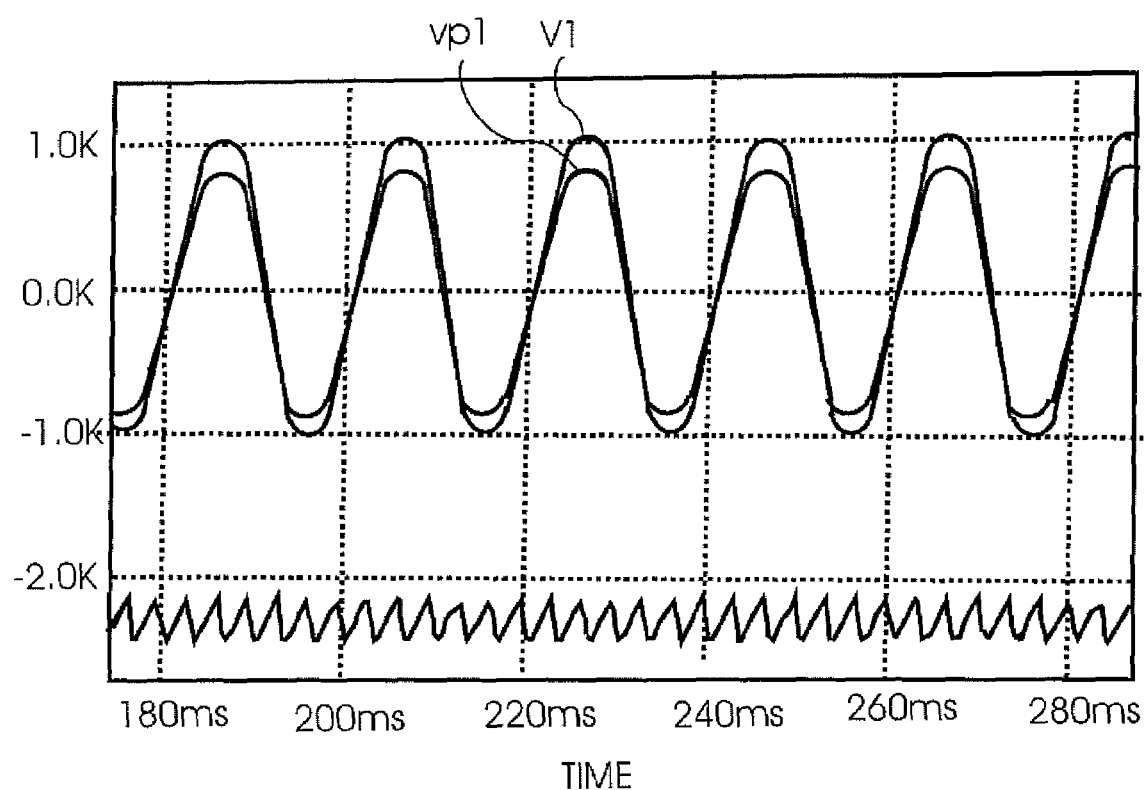

FIG. 2b illustrates the voltage reducing effect on first primary voltage vp1 caused by first switching element T10 (bipolar power transistor) and first damping component L10 in connection with first transformer 100. FIG. 2b shows a first sine-shaped voltage curve generated by first voltage source V1, and a second, somewhat smaller sine-shaped curve representing first primary voltage vp1. The amplitudes of the two sine-shaped curves in FIG. 2b are calibrated with respect to each other such that with the switching element T10 opened (i.e. first current path 112 is interrupted), the two sinus shaped curves would have the same amplitude. However, by closing first switching element T10 as soon as the voltage of first voltage source V1 exceeds a predetermined first voltage limit value, and by opening first switching element T10 as soon as the voltage of first voltage source V1 falls below that predetermined respective first, second or third voltage limit value, the amplitude of first primary voltage vp1 is reduced. This way, power generator 2 does not "see" the over-voltage of first voltage source V1 and, accordingly, is protected from overvoltage.

It should be mentioned that due to the inductance of first damping component L10, the shape of first primary voltage vp1 remains mainly sine-shaped and in phase with the voltage of first voltage source V1, which may have several advantages for the operation of power generator 2. Further, what has been explained above for first transformer and first current path 112, also applies to the circuits with the second and third transformers 200, 300 and their respective second and third current paths 212, 312.

Figure 3A:
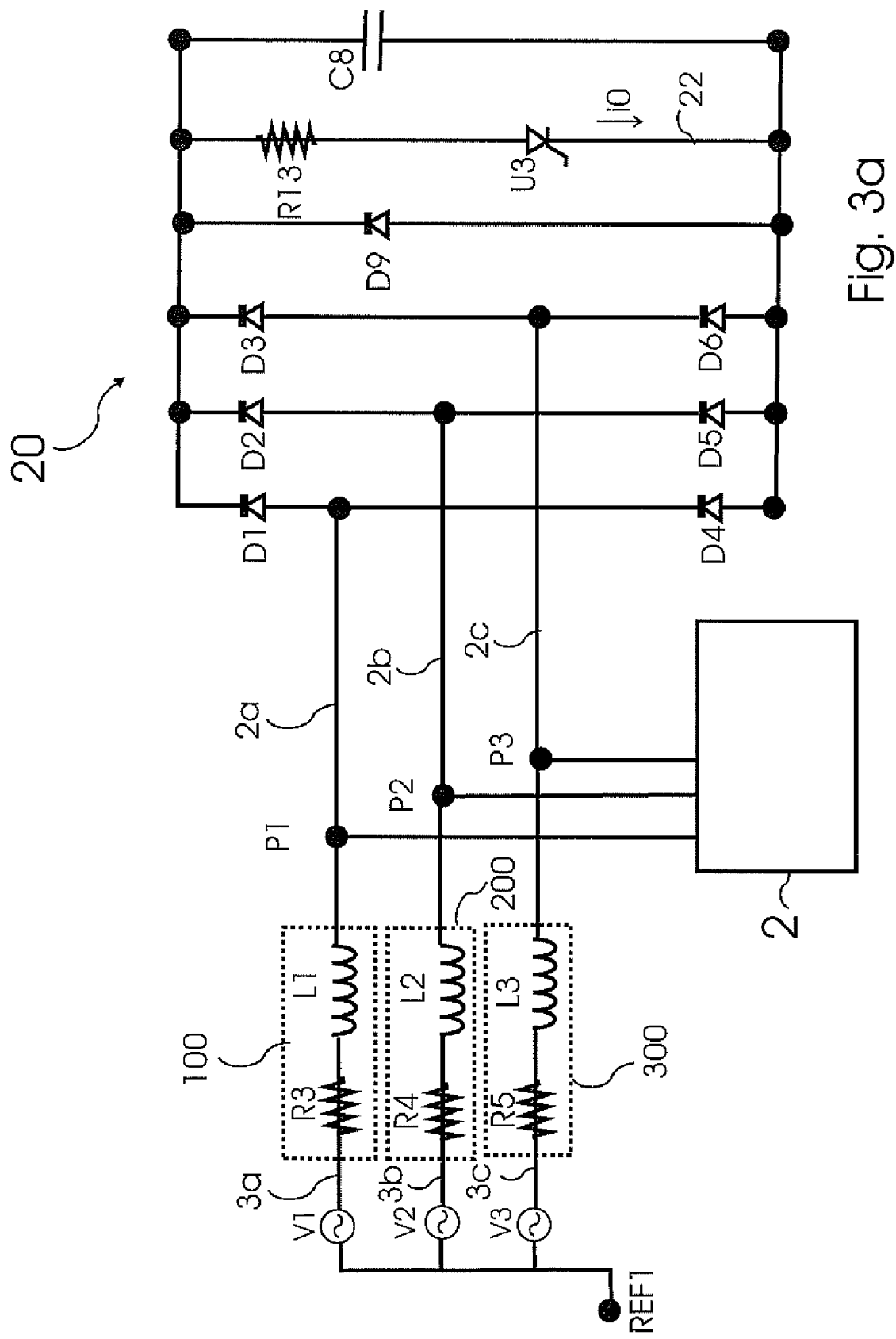
FIG. 3a is a schematic view of a wind turbine according to a third embodiment of the present invention having a single current path parallel to all of the three respective primary coils.

FIG. 3a discloses a third embodiment according to the invention. Like in FIG. 2a, first, second and third transformer 100, 200, 300 are shown as respective inductances L1, L2, L3 connected in series with respective resistors R3, R4, R5. Like in FIG. 2a, the components are preferably designed for withstanding a current that, for at least 300 to 500 ms, can be larger or equal to approximately 5 or 6 times the rated transformer current. Accordingly, a voltage measured at position P1 on first line 2a is equivalent to first primary voltage vp1 of FIG. 1, a voltage measured at position P2 on second line 2b is equivalent to second primary voltage vp2 of FIG. 1, and a voltage measured at position P3 on third line 2c is equivalent to third primary voltage vp3 of FIG. 1.

FIG. 3a differs from FIG. 2a in that first, second and third electric circuits 106, 206, 306 have been combined to provide for only one single current path 22 for all three lines 2a, 2b, 2c of power generator 2. In this case, switching element U3 is used for providing a current path when voltages generated by one of the first, second or third voltage sources V1, V2, V3 exceed a predetermined voltage limit value, and for interrupting the current path when voltages generated by one of the first, second or third voltage sources V1, V2, V3 fall below a predetermined voltage limit value. Single current path 22 comprises a single damping component R13 for limiting the current of the single current path 22. By using a single current path for all three lines 2a, 2b, 2c of power generator 2, synchronisation of the switching by element U3 is simplified.

The design of FIG. 3a differs further from FIG. 2a in that switching element U3 switches on and off without external signal. This is possible by using thyristors, GTOs (Gate-Turn-Off Thyristors) or the like which automatically switch into the conducting mode (switch closed) once the voltage between anode and cathode of the respective switching elements exceeds a predetermined threshold value, and which switch into the insulating mode (switch opened) once the voltage between the anode and cathode of the respective switching elements has fallen below a predetermined threshold voltage. Preferably, the predetermined threshold values can be controlled by a static voltage (not shown in FIG. 3a). In this case, the predetermined threshold values can be adjusted to values that correspond to the predetermined voltage limit values required for over-voltage protection. It should be mentioned that automatic switching, i.e. the switching of the switching elements without external signal, provides for good safety since in this case the over-voltage protection does not depend on a functioning signal from a control unit 9.

Again, similar to FIG. 2a, diodes D1, D2, D3 as well as diodes D4, D5 and D6 provide that the anode of switching element U3 is at a potential that is more positive than their respective cathodes.

Figure 3B:
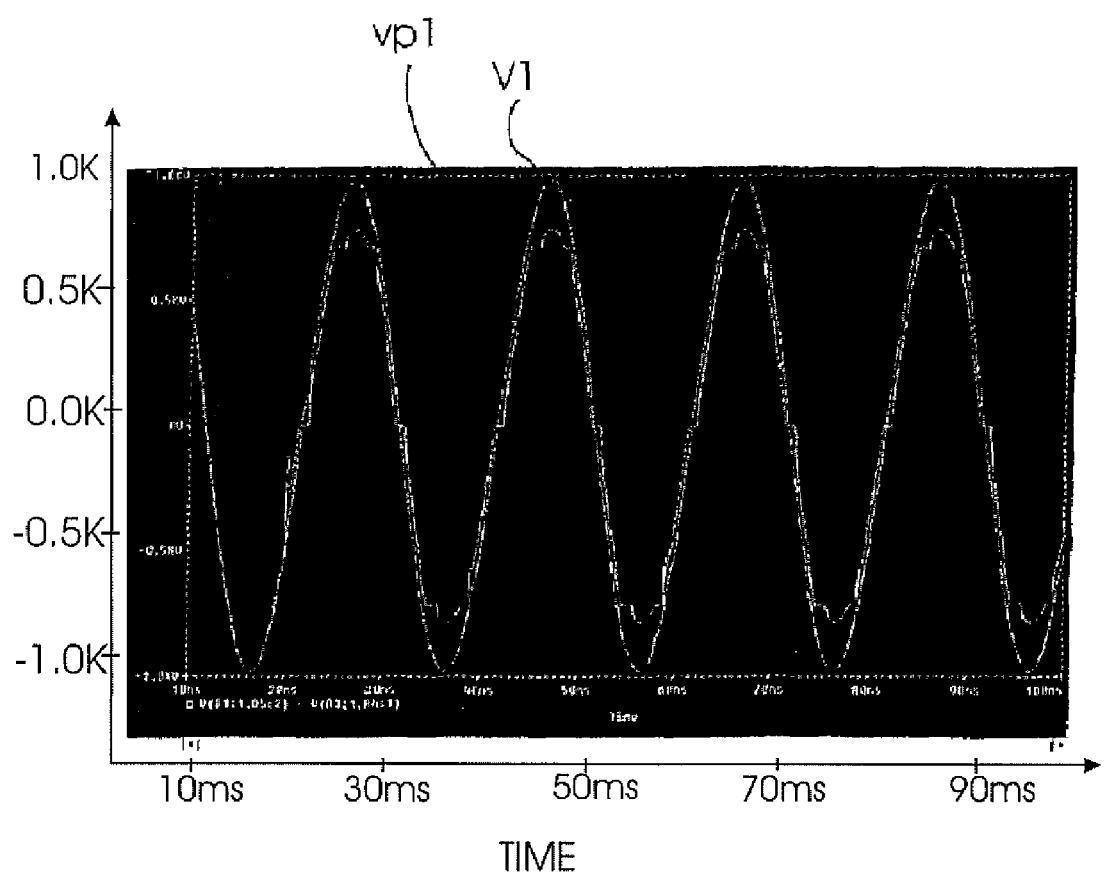

FIG. 3b illustrates the voltage reducing effect on first primary voltage vp1 caused by the electric circuit design of FIG. 3a. FIG. 3b shows a first, clean sine-shaped voltage curve generated by first voltage source V1, and a second, somewhat smaller sine-shaped curve representing first primary voltage vp1. The amplitudes of the two sine-shaped curves in FIG. 3b are calibrated with respect to each other such that with switching element U3 opened, i.e. with single current path 22 interrupted, the two sinus shaped curves would be the same. However, by closing switching element U3 as soon as the voltage of first voltage source V1 exceeds a predetermined first voltage limit value, and by opening switching element U3 as soon as the voltage of first voltage source V1 falls below that predetermined first voltage limit value, the peaks of first primary voltage vp1 seem cut off. This way, power generator 2 does not "see" the over-voltage and, accordingly, is protected from over-voltage. However, while primary voltage curve vp1 of the circuit of FIG. 2a is rather smooth (see FIG. 2b) due to inductor L10, primary voltage curve vp1 of FIG. 3b shows some disturbances.

The present invention also relates to a new method of operating a wind turbine wherein the wind turbine comprises a first line 2a for providing power to a first power line 3a of a power grid. The method according to the invention includes the steps of (a) detecting the voltage of said first power line; (b) connecting a first current path to said first line 2a in case that said first voltage exceeds a predetermined first voltage limit value; and (c) disconnecting said first current path from said first line 2a in case that said first voltage falls below said predetermined first voltage limit value.

Preferably, this method is applied equally to a second line 2b for providing power to a second power line 3b of the same power grid and, possibly, to a third line 2c for providing power to a third power line 3c of the same power grid. In this case the method includes the steps of (a) detecting the voltage of said second and/or third power line 3b, 3c; (b) connecting a second and/or third current path to said second and/or third line 2a in case that said second and/or third voltage exceeds a predetermined second and/or voltage limit value; and (c) disconnecting said second and/or third current path from said second and/or third line 2a in case that said second and/or third voltage falls below said predetermined second and/or third voltage limit value. Preferably, said first, second and or third current paths are each connected in parallel to the respective first, second or third primary coils 102, 202, 302. Further, preferably, predetermined first, second and third voltage limit values are the same value.

In a preferred embodiment, said first, second and/or third current paths are each connected and disconnected by switching a switching element as described for example, in FIGS. 1, 2a, and 3a. Therein, the switching elements are one of the semiconductor components describes previously like, e.g., a power transistor, an insulated-gate bipolar transistor (IGBT), an integrated-gate commutated thyristor (IGCT), a gate-turn-off transistor (GTO), a thyristor, or a semiconductor controlled rectifier (SCR). By connecting the first, second and/or third current path to the respective first, second or third line 2a, 2b, 2c, the respective first, second or third primary voltage across respective first, second or third transformers 100, 200, 300 are reduced so that in the case of over-voltage on the grid, the generator does not "see" the over-voltage. On the other hand, by disconnecting the first, second and/or third current path from respective first, second or third line 2a, 2b, 2c in case that a voltage equal or below a predetermined respective first second or third voltage limit value prevails in a respective first, second or third power line 3a, 3b, 3c, generator 2 can operate normally without that any current and, accordingly, any power is lost to any of the respective first, second or third current path. This way, by connecting and disconnecting respective first, second and/or third current paths from respective first, second or third lines 2a, 2b, 2c depending on the voltages of the power grid, an economical protection of the generator from grid over-voltages provided.

It should be mentioned that the detection of voltages of the first, second and/or third power lines 3a, 3b, 3c can be carried out in different ways. For example, in one embodiment, detection of voltages of the first, second and/or third power lines 3a, 3b, 3c is carried out by measuring respective first, second or third secondary voltages vs1, v2, vs3 across the respective first, second or secondary coils 104, 204, 304, or by measuring a respective first, second or third primary voltages vs1, v2, vs3 across respective first, second or third primary coils 102, 202, 303. In these cases, the measured voltages are preferably fed to central control unit 9 which controls the respective switching elements 108, 208, 308, e.g. respective switching elements T10, T20, T30, according to the measured voltage values, as shown in FIG. 2a.

In another preferred embodiment, the detection of the voltages of the first, second and/or third power lines 3a, 3b, 3c is carried out passively by exposing first, second and/or switching elements to the voltages provided by the power grid. In this case, the respective switching element U3 automatically switches into a conducting mode (switch closed) once the respective voltage exceeds a predetermined voltage limit value, and into an insulating mode (switch opened) once the respective voltage has fallen below that predetermined voltage limit value. Switching "automatically" means that no external active control line is required to change the switching mode of the respective switching element, as illustrated in FIG. 3a.

As mentioned before, the embodiments of the present invention represent only particular designs of the invention. A skilled person easily knows how the design can be altered without deviating from the scope of the invention. In particular, a skilled person easily knows that one type of switching elements can easily be replaced by another switching element type and that in this case, the circuitry has to be adjusted accordingly. For example, where a power transistor has been used as switching elements, it can be easily replaced by a thyristor, or vice versa, by adjusting the circuit accordingly.

The invention claimed is:

1. A wind turbine having a power generator for generating power for a first power line of a power grid, said wind turbine comprising:
 a first transformer having a first primary coil connected to said power generator and a first secondary coil connected to said first power line for transforming a first primary voltage across said first primary coil to a first secondary voltage across said first secondary coil; and
 a first electric circuit connected to said first primary coil, said first electric circuit having a first switching element for providing a first current path parallel to said first primary coil if said first secondary voltage exceeds a predetermined first voltage limit value.

2. The wind turbine according to claim 1, further comprising:
 a second transformer having a second primary coil connected to said power generator and a second secondary coil connected to a second power line of said power grid for transforming a second primary voltage across said second primary coil to a second secondary voltage across said second secondary coil; and
 a second electric circuit connected to said second primary coil; said second electric circuit having a second switching element for providing a second current path parallel to said second primary coil if said second secondary voltage exceeds a predetermined second voltage limit value.

3. The wind turbine according to claim 2, further comprising:
 a third transformer having a third primary coil connected to said power generator and a third secondary coil connected to a third power line of said power grid for transforming a third primary voltage across said third primary coil to a third secondary voltage across said third secondary coil; and
 a third electric circuit connected to said third primary coil; said third electric circuit having a third switching element for providing a third current path parallel to said third primary coil if said third secondary voltage exceeds a predetermined third voltage limit value.

4. The wind turbine according to claim 3, wherein at least one of said first electric circuit, second electric circuit and third electric circuit comprises a respective first, second or third damping component for limiting the current of said respective first, second or third current path.

5. The wind turbine according to claim 4, wherein at least one of said first, second and third damping components is a resistor or an inductor connected in series with said respective first, second or third switching element.

6. The wind turbine according to claim 3, wherein at least one of said first, second and third switching elements is capable of interrupting said respective first, second or third current path if respective first, second or third secondary voltage falls below said respective predetermined first, second or third voltage limit value.

7. The wind turbine according to claim 3, wherein at least one of said first, second and third switching elements is capable of switching a current of more than 0.01% of the nominal maximal current of said respective first, second or third primary coil.

8. The wind turbine according to claim 3, wherein at least one of said first, second and third switching elements comprises at least one power semiconductor component comprising a power transistor, an insulated-gate bipolar transistor (IGBT), an integrated-gate commutated thyristor (IGCT), a gate-turn-off transistor (GTO), a thyristor, or a semiconductor controlled rectifier (SCR).

9. The wind turbine according to claim 3 whereby, wherein the switching of at least one of said first, second and third switching elements is controlled by a control unit that is capable of detecting when said respective first, second or third secondary voltage exceeds said respective predetermined first, second or third voltage limit value.

10. The wind turbine according to claim 3, wherein the first, second and third electric circuits are combined to have a single current path.

11. The wind turbine according to claim 7, wherein the at least one of said first, second and third switching elements is capable of switching a current of more than 0.1% of the nominal maximal current of said respective first, second or third primary coil.

12. The wind turbine according to claim 7, wherein the at least one of said first, second and third switching elements is capable of switching a current of more than 1% of the nominal maximal current of said respective first, second or third primary coil.

13. A method of operating a wind turbine having a first line for providing power to a first power line of a power grid via a transformer, the transformer having a primary coil connected to the first line and a secondary coil connected to the first power line, the method comprising:
- detecting a voltage across the secondary coil;
- connecting a first current path parallel to the first line to the primary coil in case that said voltage exceeds a predetermined first voltage limit value; and
- disconnecting said first current path from the primary coil in case that said voltage falls below said predetermined first voltage limit value.

14. The method according to claim 13, wherein said first current path is connected and disconnected by switching a switching element.

15. The method according to claim 14, wherein said switching element is a semiconductor component comprising a power transistor, an insulated-gate bipolar transistor (IGBT), an integrated-gate communtated thyristor (IGCT), a gate-turn-off transistor (GTO), a thyristor, or a semiconductor controlled rectifier (SCR).

* * * * *